Oct. 25, 1932.  G. LANGFORD  1,883,982
RAIL JOINT AND BAR
Filed Nov. 7, 1930  4 Sheets-Sheet 1

Inventor:
George Langford
By Brown, Jackson, Boettcher & Dienner
Attys.

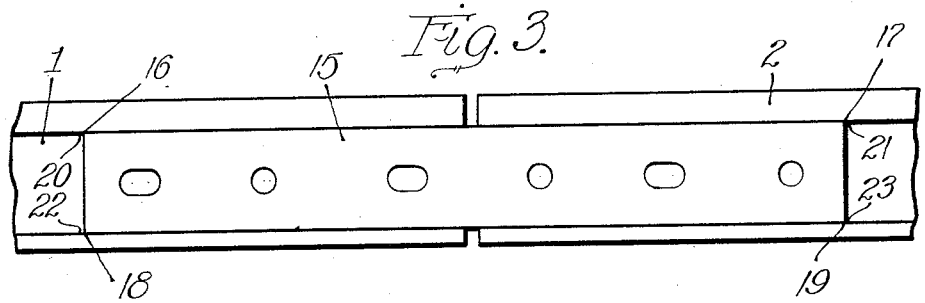
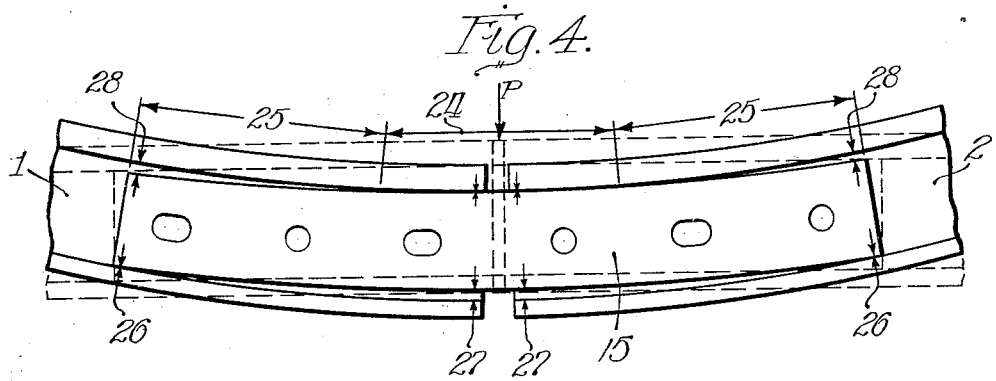
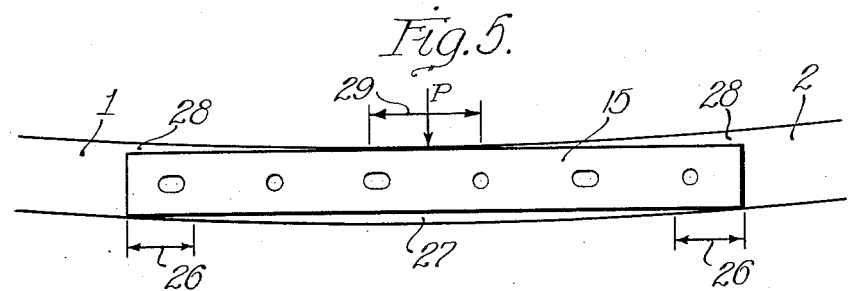
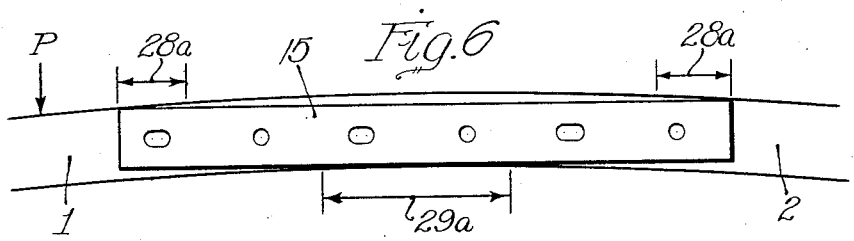

Oct. 25, 1932.   G. LANGFORD   1,883,982
RAIL JOINT AND BAR
Filed Nov. 7, 1930   4 Sheets-Sheet 3
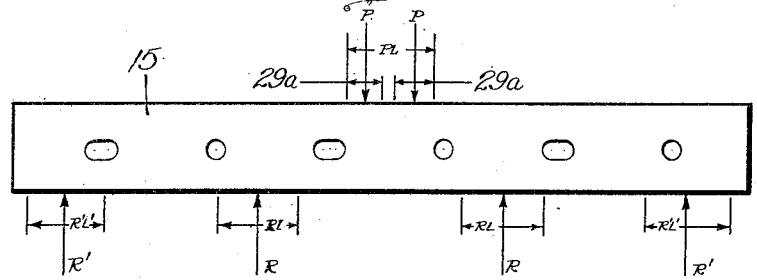
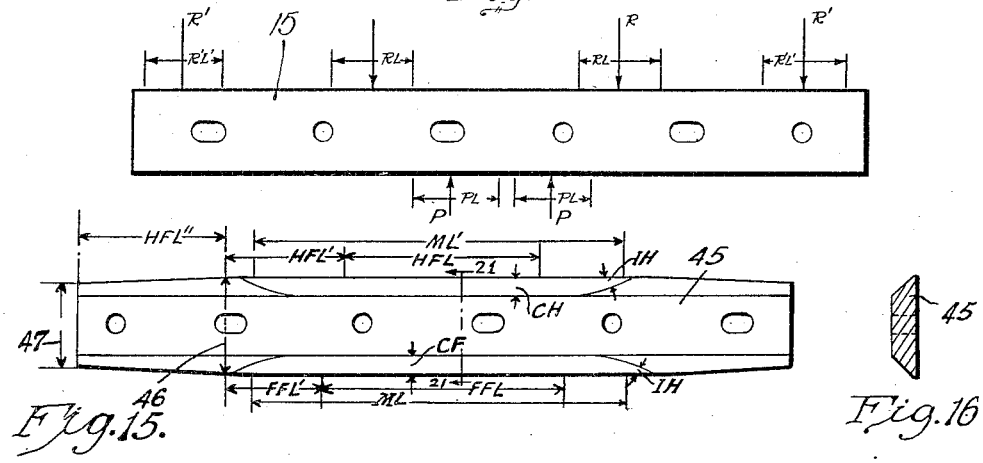
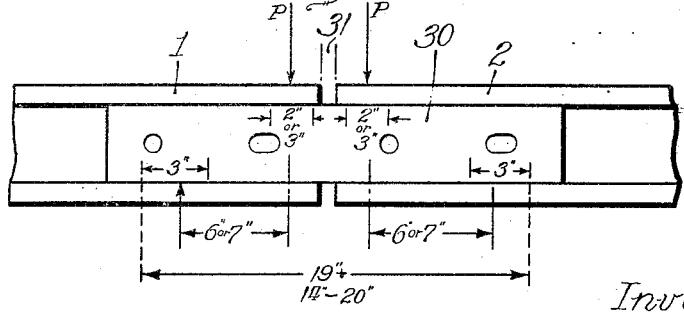
Inventor:
George Langford
By Brown, Jackson, Boettcher & Dienner.
Attys.

Oct. 25, 1932.   G. LANGFORD   1,883,982
RAIL JOINT AND BAR
Filed Nov. 7, 1930   4 Sheets-Sheet 4
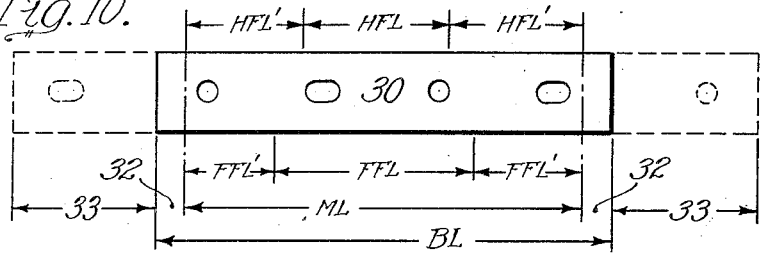
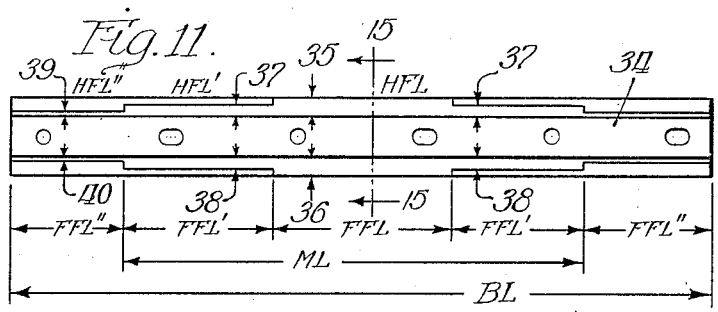 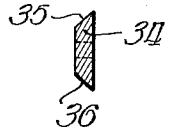
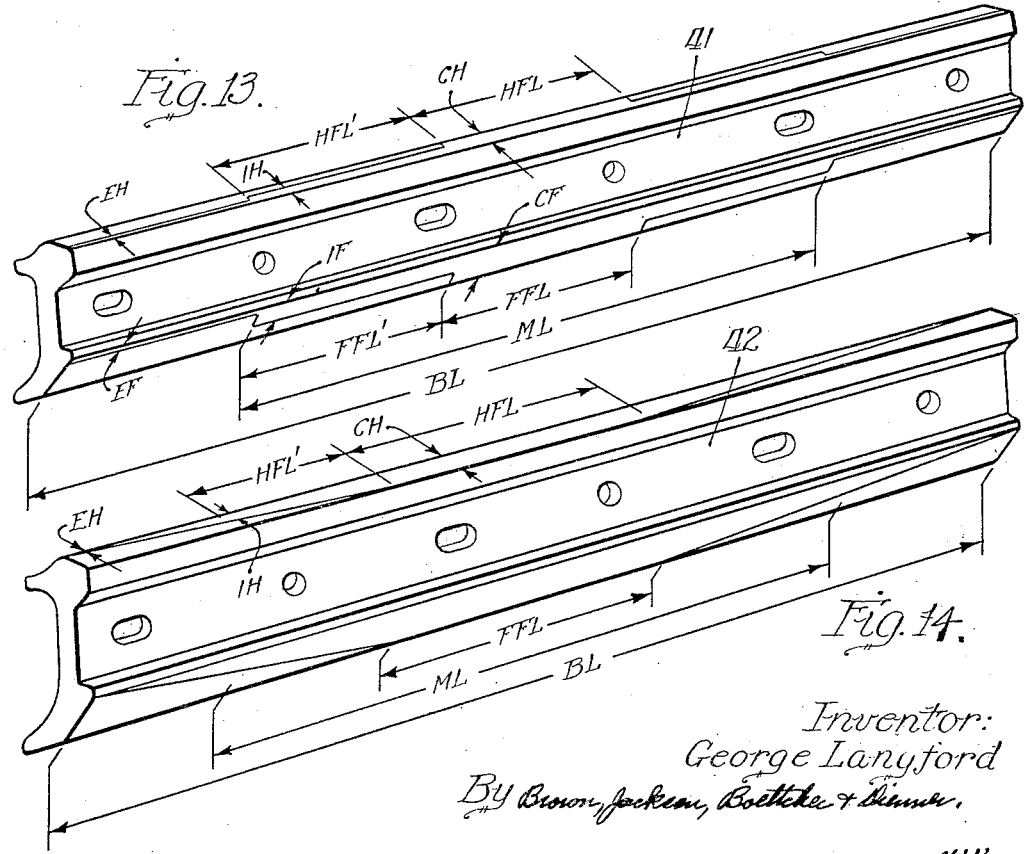
Inventor:
George Langford Patented Oct. 25, 1932

1,883,982

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RAIL JOINT AND BAR

Application filed November 7, 1930. Serial No. 494,071.

The present invention has to do in general with bars used for bolting in pairs to rail ends in a track to make a joint, and has particular reference to novel features embodied in the fishing surfaces whereby the joint as a whole is maintained efficiently from the time the new bars are first applied to when they are worn out.

The main object of the present invention is to modify the fishing surfaces of an ordinary type of bar, as to spacing and dimensions so that the bar will meet the structural conditions imposed upon it when in a track under vertical load. Another important object is to insure correct lateral movement of the bar to the rails when it is in a joint subject to wear. Still another object is to furnish a fishing contact length corresponding to the bending moment length required in the bar to function as a simple beam. Another object is to produce as near as is possible a bar that will act with the rail ends while in a joint as an integral structure. Another object is to correct faults in long bars, unnecessary structurally but made so for certain purposes. Still another object and the main one of this invention toward which the previously named objects are directed, is the construction of a rail joint by means of a bar with fishing contact surfaces so modified as compared with bars of known type, that when the bar is bolted to rail ends to make a joint, the bar will make tight contact at center under load and will act with the rail ends as an integral structure, maintaining the tight center and integral action after wear of the fishing contacts begins under repeated loads. Further objects and advantages will become apparent from the following detail description.

In the drawings:

Figure 3 is a diagrammatic side view of a rail joint, unloaded;

Figure 4 is a diagrammatic side view of a rail joint, loaded;

Figure 5 is a diagrammatic side view of a joint under positive load;

Figure 6 is a diagrammatic side view of a joint under negative load;

Figure 7 is a diagrammatic side view of a long bar under positive load showing how the pressures and reactions apply;

Figure 8 is similar to Figure 7, but with the bar under negative load;

Figure 9 is a diagrammatic view of a short bar showing the rail ends and giving actual dimensions;

Figure 10 is a side view of a short bar laid over a long bar for purposes of comparison of the fishing surface lengths required for performance as a simple beam, the end portions of the long bar being indicated by dotted lines;

Figure 11 is an inside view of a bar embodying the features of my invention showing the required fishing lengths;

Figure 12 is a section taken substantially on line 15—15 of Figure 11;

Figures 13 and 14 are perspective inside views of long six hole bars embodying three forms of my invention;

Figure 15 is an inside view of a long six hole bar in accordance with my invention;

Figure 16 is a section taken substantially on line 21—21 of Figure 15;

In order to obtain a clear understanding of my invention it is necessary to consider the various actions and reactions, distribution of pressures, and other factors which affect the wear and performance of a rail joint.

It is well known to makers and users of rail joints that only a very restricted portion of the length of the bar is subject to severe wear and strains, this restricted portion being at the center for a length of only a third or less of the length of the short bar and a considerably smaller proportion of the length of a long bar. As the central portion of the bar wears on its fishing surfaces the end portions, which are reluctant to wear, resist drawing in of the bar at center by bolt tension as central wear occurs. Ordinarily, in the past bars were flexible enough laterally to be forced in at center by bolt tension, and as wear occurred on the fishing surfaces this wear was taken up to some extent by forcing the central portions of the bars to the rails. However, the bars now in use, which are laterally stiffened with increase of section and also by heat treatment, are strong enough laterally to resist inward bending at center, the bolts not being strong enough nor the tension applied by screwing up the nuts sufficient to bend the bars inward at center.

Although it is well known that the wear in a joint is restricted to a small central portion of the bar length and that as this restricted or central length becomes worn the bars must be bent in at center, nevertheless it has become very common practice for most of our larger railroads using very heavy rail to also use bars much strengthened and stiffened, also heat treated, the result being that it is practically impossible to bend them in to the rails laterally with bolt tension so as to take up central wear. In addition the standard four hole 24 inch bar is in many instances being replaced by six hole bars 36 inches long and longer, particularly on heavy rails.

The main reason for using a long bar is to provide a three tie joint, with one tie directly under the center. The three ties are usually spaced somewhat closer to each other than are the rest of the ties in the body of the track, the purpose being to better distribute the load at the joint to the ballast by closer tie spacing at the joint. Inasmuch as the bars are fastened to the rail ends and do not rest upon the ties the use of the central tie and closer tie spacing does not strengthen the joint, merely serving to distribute better the load through the track.

Figure 1:
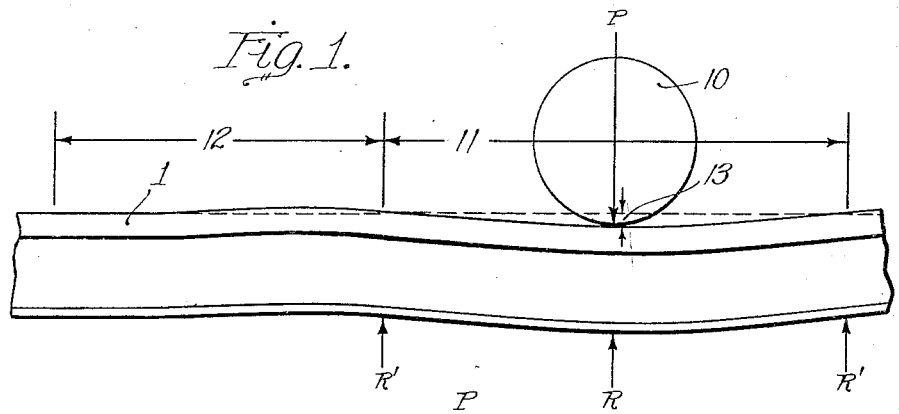
Figure 1 is a side view of a railroad track rail showing the vertical wave motion under load.

Due to the impracticability of designing a track structure of sufficient strength and stiffness to avoid deflection under the heavy loads imposed upon it, the ordinary track composed of steel rails resting upon cross ties embedded in ballast, will be given a vertical wave motion under the wheels of passing trains. This is illustrated in Figure 1, where 1 is a side view of a rail, and 10 the wheel of a heavily loaded car. The vertical load of wheel 10 or pressure is represented by the arrow P, and the reactions to this pressure, by R and R'. For the distance 11, the rail is stressed by positive bending moments and deflects downward; but for a distance 12 each side of 11, the deflection is upward and the rail is stressed by negative bending moments. When the wheel 10 moves from the center of distance 11 to the center of distance 12, the conditions of vertical deflection and bending moments will be reversed. Assuming the track to be of unbroken rail length, the wave motion could be brought to some degree of uniformity. A continuous rail is impractical however, and so the track must be made up of short lengths coupled together. This condition breaks up the continuity of the wave motion.

Figure 2:
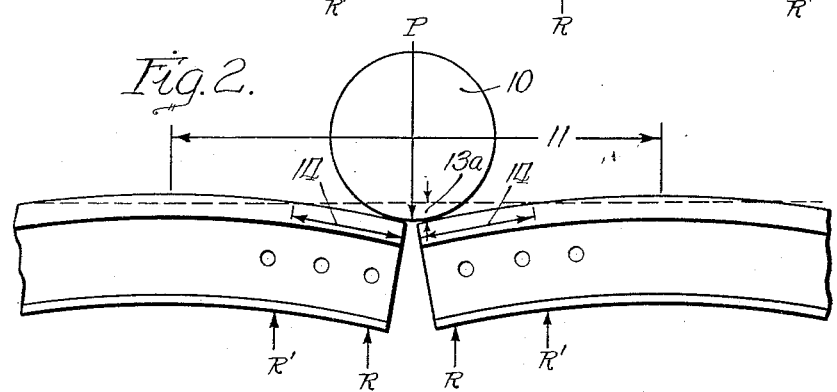
Figure 2 is a side view of a rail joint under load, with the bars removed.

In Figure 1, the length 11 is downwardly deflected by a distance 13, the rail assuming a curve under this deflection. However, in non-continuous track, the moving load P must pass over a joint. Figure 2 is a side view of two rail ends 1 and 2 with the joint bars removed for purpose of description. As the load reaches the central position, the rail ends will deflect downward for the distance 13$^a$. This deflection is not accompanied by a gradual curve along distance 11 as in Figure 1. Instead the rail ends merely bend sharply downward and have their top and bottom surfaces uncurved for the length 14 and 14 in each rail end, beyond which, curvature begins. The deflection 13$^a$ is also considerably greater than at 13 in Figure 1 and the reactions R and R' become much greater near the center under pressure P. When the joint bars are applied, they assume much of the bending moment, and there is a change from the conditions of Figure 2 toward those of Figure 1; but to even closely approach the latter, the joint bars must be designed so that the rail joint composed of rail ends and joint bars will compose an integral structure.

In the past it has been assumed that a joint made up of rail ends and well designed bars would result in integral action of bars and rail ends even under heavy moving loads. However, it has been found that because of the differences in curvature of bars and rail ends under load, tightness of the fishing contacts will not be uniform but restricted to limited areas, shifting as the load moves. An unworn joint not loaded may have uniformly tight fishing contact with the rail ends throughout the bar length but when under moving load, the forces which produce difference of curvature in the bars and rail ends are too great to be resisted by bolt tension, the only means available to hold the bars and rail ends in tight uniform fishing contact throughout the bar lengths. The bolts may yield but a slight amount, and yet this amount is sufficient to loosen the fishing contact and permit some independent action of bars and rail ends which with their overwhelming tendencies to assume difference of curvature under moving load, are quick to take advantage of lessened restriction. This is assuming that the bolts are properly tight. If they are allowed to become loose, the independent action of rail ends and bars increases. This independence of action between bars and rail ends is due to the difficulty of so fitting the fishing contacts of the bars to the rails at the central portion of the joint that there will not be any vertical movement between bars and rail ends at center when the joint is under load.

Railway engineers have decreed that while a tolerance of .002 or .003 of an inch vertical movement is permissible, this tolerance should be reduced to .001 of an inch to insure a first class joint. With this .001 of an inch tolerance the bars and rail ends should act almost as an integral structure. However, although bars and rail ends might be thus fitted when new, such a fit is most difficult to maintain in a joint when wear begins. The greater the vertical movement the greater the independent action of bars and rail ends.

Figure 3 is a diagrammatical side view of a long bar 15, and two rail ends 1 and 2, the line 16—17 representing the head fishing surface of the bar and 18—19 the flange fishing surface. Corresponding rail fishing surfaces are 20—21 for the head fishing and 22—23 for the flange fishing. Figure 3 represents an unworn rail joint not under load.

Figure 4 is a view similar to Figure 3 but with load applied near the center as indicated by arrow P. It has been shown by actual test, that when under positive load, the rail ends have very little curvature at the center 24 and considerable curvature toward the ends, 25, the bars in turn having most of their curvature at the central portion and very little at the end portions. This means that when under positive load the fishing surfaces of rail ends and bar are in tightened contact at the center portion 24 of the head fishing and at the end portions 26 of the flange fishings, also being in least contact at 27 of the flange fishings and 28 of the head fishings.

In a rail joint the bars will take all of the bending moment at the ends of the rails, but the rails will take all of the bending moment at the ends of the bars, the intermediate bending moments being divided between rails and bars. In a joint under load the curvature of the rail ends increases from the center of the joint outward in either direction, while the curvature of the bars increases from the ends of the bars inward, so that under positive load the fishing surfaces of bars and rails become loose at some portions and tight at others, as shown in Figure 4. This condition is more simply illustrated in Figure 5, where the joint is shown under positive load P. This load, because of the previously described variations of curvatures between bars and rail ends, has a limited length of contact 29, which represents the head fishing contact, the pressure on the rail head being transmitted through the under side to the bar head, this pressure being resisted by the reaction lengths 26 on the flange fishing surfaces where there is close contact.

Figure 6 is illustrative of the negative load which results when the positive load P is away from the rail joint. The pressure is then applied over the length 29$^a$ of the flange fishing of the bar, and the reactions are at 28$^a$ on the head fishing.

Due to the non-integral action between bars and rail ends and to the reversal of conditions from positive to negative as the load passes over the joint, the locations of applied power and the reactions are constantly shifting. In Figure 7, which is a diagrammatical side view of a long six hole bar under positive load P, due to difference of curvature between bar and rail ends, the load is concentrated as pressure for a short distance at each rail end a little way from each rail end, as represented by lengths 29$^a$, which in the bar cover a length of PL. The reactions to these applied pressures are carried on very short lengths RL, whose central point or resultant reaction, intermediate center and ends, is represented by R with the addition of slight reactions R' on the lengths R'L'. These concentrations of applied pressure and reactions are restricted to these very limited lengths due, as previously explained, to the difference in curvature between the bar and rail ends, these measurements varying somewhat in various types and sections of bars.

Figure 8 is the reverse of Figure 7, the first named showing the positive bending moment as applied, and the second the negative bending as occurs when the load is away from the joint.

The conditions under positive loading for a long six hole bar as shown in Figure 7 and a four hole short bar show no difference in the distribution of applied pressure and only slight differences in the reaction distributions, except that in the long bar slight secondary reactions are carried nearer the ends. However, these secondary reactions have no noticeably marked effects, and for practical purposes the short bar fulfills the conditions of the long bar as regards lengths of the pressure and reaction surfaces.

It has been found in ordinary bars that the reaction lengths in a 24 inch bar are restricted to a certain range this range being three inches or more depending upon various conditions. This length applies to bars of uniform fishing height and uniform widths of head and foot fishing surfaces throughout the bar length, these fishing surfaces being continuous from end to end. It must be remembered that in speaking of pressure and reaction fishing surfaces, this refers to tightness of bar and rail fishing contact. The contacts elsewhere may be maintained without actual separations as shown in the diagrams, these being intended to illustrate variations in tightness of contact or pressure upon the bar and rail fishing surfaces throughout the length of the joint when under load.

Due to the differences of curvature between bars and rail ends under positive and negative loading, as shown in Figures 4 to 7 inclusive, and the resultant restricted lengths of tight fishing contact illustrated in Figures 7 and 8, it can be seen that a bar in a rail joint under positive load, in the tightness of its fishing contacts may be likened to a simple beam loaded in the middle and supported near the ends, the ends not being fixed but having freedom of vertical motion. From exhaustive tests on bars varying in type, length, sectional design, stiffness and other conditions, various measurements of a general nature are available in reference to bending moments, lengths of concentrated pressure and reactions and positions of resultant pressures and reactions under load. These measurements are shown in Figure 9, a diagrammatic side view of a new four hole rail joint, in which 1 and 2 are the rail ends, and 30 a joint bar having four bolt holes and being of 24 inch standard short length. The joint is under positive load at P on each rail end for a distance of from two to three inches a little away from each rail end. P and P represent the positions of the resultant pressures, shown two inches plus apart to which must be added a gap 31 between the rail ends, and slight extension of the pressure lengths away from each rail end due to variations, making the pressure lengths for bars in general two to three inches plus. These lengths would be further slightly increased by slightly increased vertical movement between bar and rail ends resulting from initial use and wear. The central portion of the angle bar would then be called upon to take the loads at P upon its head fishing surface for a length of from about five to seven inches. The resultant reactions at R and R' are ordinarily about seven inches each way horizontally from P and may be as low as five inches under my special construction. They cover a length of about three inches in a short angle bar, somewhat less in a short heavy bar, and a little more in a long bar. These dimensions of pressure and reactions are dependent upon section of bar to some extent, and in heavy I-beam sections the lengths would be somewhat shorter than in lighter bars. The figures given are for bars now used in track and would result in a length of nineteen plus inches of overall tight fishing contact required for moment length, or not more than twenty inches for present joints as determined by actual tests. These joints have some vertical motion between bar and rail ends at the center of the joint, the moment length of nineteen plus inches being lessened with less vertical motion at the center of the joint, and further lessened in the case of bars of heavy section, to a low limit of fourteen inches. This lessening moment length is an approach to the ideal condition of a tight center and integral action between bar and rail ends. As the purpose of the present invention is to secure a tight center and integral action, the low limit of fourteen inches and the high limit of twenty inches will be used for purpose of definition. This means that for positive and negative loading, the bar should have snug head and flange fishing contact for from five to seven inches of its length at center and that the head and flange fishing surfaces should be of ample width for this five to seven inches to carry the load concentrated upon them; and furthermore that the head and flange fishing surfaces should have tight fishing contact with the rail ends intermediate the center and ends, these contacts being each about three inches long resulting in a fourteen to twenty inch total length of each of the head and flange fishing contact.

Figure 10 is a side view of a short four hole bar laid over a long six hole bar, the latter being shown in dotted lines HFL symbolizes the length of head fishing which carries the concentrated load and corresponds to PL of Figure 7. ML represents the length of fishing contact required to secure sufficient bending moment, this being shorter than the bar length BL. The lengths HLF' each side of HFL have fishing contact at least near the ends. HFL which carries the concentrated load is of ample fishing width and area, more so than HFL' each side of it which although not carrying the concentrated load must have fishing contact near the ends at least to secure sufficient bending moment and also to provide for the reactions under negative bending moment. The same is true of the flange fishing where in some sections of bars the length FFL of the flange may be made longer than HFL of the head. There still remain the lengths 32 in a short bar, to which are added lengths 33 in a long bar not needed to secure the strength of a joint and therefore useless except for spiking and spacing of ties at the joint.

It can be seen therefore that in a bar of standard short length of 24 inches, or in any length over 24 inches, the extra end lengths exceeding the twenty to fourteen inches of overall tight fishing contact may be dispensed with, either by actually shortening the bar to a twenty to fourteen inch length, or by retaining the full length and merely making one or both of the fishing surfaces of the end portions out of tight contact with the rail ends.

Figure 11 is an inside view of a long six hole bar 34 embodying the features of my invention. This, for convenience of description, is represented as a flat bar. Figure 12 is a central sectional view of bar 34, 35 being the head fishing surface and 36 the foot or flange fishing surface. In Figure 11, ML represents the overall fishing contact length, which is the length required for bending moment. BL is the total bar length. HFL is the length of head fishing contact which takes the direct pressure under positive load, and FFL is the length of flange fishing contact which takes the direct pressure under negative load. As the surfaces of HFL and FFL bear the brunt of pressure under load and have the greatest wear, their widths of fishing contact 35 and 36 are made maximum or greater than the head and flange fishings HFL' and FFL', each side of the bar's central portion, the width of which for the head is shown at 37, and for the flange at 38. As HFL' and FFL' carry only the reactions away from center and not the load at center, wear on the reaction surfaces does not impair the tightness at center, therefore less width of fishing surface is required, and I make them of less width so that they may wear in amount as compared with the central fishings HFL and FFL to move inwardly under bolt tension at substantially the same rate or faster than the central fishings. In this way I avoid uneven take-up of the bar and the necessity of bending the bars in laterally at center as wear progresses. The end portions of the bar do not require fishing contact, for the reason that they do not contribute to the bending moment which is provided for in the length ML. The bar end fishings 39 and 40 would therefore have no contact with the rail fishings, and the area of fishing contact at each end would be zero. In a track the central wear of top fishing surface under positive load is generally more severe than the central wear of bottom fishing under negative load, and so my invention is particularly directed to the proper design of fishing for the top surface of the bar.

In Figure 11 HFL may be defined as the head pressure length and FFL the flange pressure length, these lengths being limited, as previously described, to five to seven inches for the head fishing and possibly a little more for the flange fishing, the respective widths of head and flange fishing being greater than in the intermediate and end portions of the bar. The moment length ML, representing the overall fishing contact, would likewise be limited to a length of from fourteen to twenty inches, having at least three inches or more fishing contact at each end. The width of the fishing surfaces at the intermediate portions of the bar, each side of the restricted central portion, are made substantially less than at the central portion. The portions at each end outside of the moment length ML of Figure 11 will be referred to as end portions. These end portions will ordinarily have no fishing contact with the rails, although in special cases they may have slight or partial contact for reasons to be explained. The symbols HFL, HFL', FFL, FFL', HFL" and FFL" and ML previously defined and limited as to lengths will be hereafter used in the figures and specifications, these symbols representing the lengths of fishing surfaces as applying to the bar under load:

HFL equals head fishing pressure length at center under positive load.

FFL equals flange fishing pressure length at center under negative load.

HFL' equals head fishing reaction intermediate lengths under negative load.

FFL' equals flange fishing reaction intermediate lengths under positive load.

HFL" equals length of head fishing surface; end portion.

FFL" equals length of foot fishing surface; end portion.

ML equals bending moment length or overall fishing contact length.

Referring to Figure 11 it may be seen that the end portions are of considerable length. If entirely out of contact with the rails, they are apt to result in a rattly or noisy track, and they may therefore be given very slight fishing contact with the rails so as to hold them in place, this slight contact being too reduced to retard movement of the bars in at center as wear occurs. This is shown in Figure 13 which is an inside perspective view of a bar 41 similar to that of Figure 11, except that the bar ends have small widths of fishing contacts EH and EF, which are considerably less than the intermediate fishing widths IH and IF, the latter in turn being substantially less than the central fishing widths CH and CF. The symbols CH, IH, EH, CF, IF and EF will be used hereafter to designate head and flange fishing widths at the central, intermediate and end portions of the bar.

In Figure 13, which illustrates a long six hole bar, the reductions of fishing widths from center to ends are accomplished in three steps. Applied to the head fishing, these steps are CH, IH and EH, CH and IH being included in the restricted lengths HFL and HFL'. The same is true of the flange fishing surface. These reductions or steps are preferably accomplished in dies under a power press, although they might be made less accurately by the method known in the art as multiple rolling.

More gradual reduction might be simpler from a practical standpoint as in the bar 42 of Figure 14. Here the width CH is maintained for the lengths HFL, then decreases gradually each side for the lengths HFL', this reduction continuing to the bar ends, or terminating with no effective fishing contact outside of the length ML. In Figure 14, the flange fishing reduction curve is reversed from that shown on the head fishing. This is merely a variation. Either curve may be applied to either fishing surface, and there are other methods of end reduction which may be employed.

Figure 15 is an inside view of a long six hole bar 45, such bar being shown in section in Figure 16 as a flat strap to facilitate description. As the bending moment length, ML required for positive loading may be decreased somewhat for negative loading, length ML' may be slightly less than ML. The head fishing at the ends of an ordinary long bar being in tight contact under negative load, and the end flange fishings in tight contact under positive load, these tight reaction contacts being outside of the bending moment lengths ML and ML', are a hindrance as they encourage greater deflection of the bar at center. The flange fishing surface is therefore tapered from a fishing height 46 beyond ML to a lesser height 47 at each end. The head fishing may be similarly tapered at the ends to accommodate the tight end reaction contacts. The various treatments of the end portions of a long bar may be applied to shorter bars down to the maximum length of twenty inches required for bending moment, the lengths of the end portions only being reduced and all other lengths and widths expressed by the symbols retaining the same measurements in the short as in the long bar.

Figure 17:
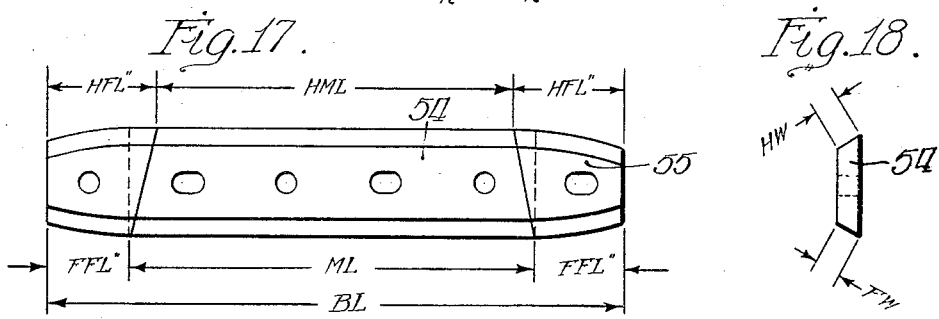
Figure 17 is an inside view of a long bar in accordance with my invention with a short bar, also in accordance with my invention, superposed upon the long bar.
Figure 18:
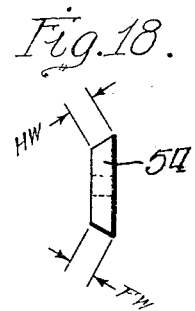
Figure 18 is an end view of the short bar of Figure 17.

While my invention is particularly directed to reduction of fishing surface contact outside of the central portion of a bar, it may be applied to bars of ordinary fishing type wherein the widths of head and foot fishing surfaces do not vary throughout the bar length. A bar 54 of this type is shown in Figure 17, which is an inside view, and in end view in Figure 18, in which for convenience the bar is represented as a flat strap. The widths of head fishing HW and of foot fishing FW are respectively the same throughout the bar length. In Figure 17, a short four hole bar 54 of length ML is superimposed upon a long six hole bar 55 of length BL. The length of the short bar is ML or FFL plus 2FFL', as in Figure 10, which expressed in figures is twenty to fourteen inches, the shorter length being best suited to bars of heavy symmetrical sections. This short bar may have its ends inclined so that HML, the overall length of head fishing contact, is not less than fourteen inches and not more than twenty inches. In the long six hole bar of length BL, the moment or overall fishing length ML is maintained at from twenty to fourteen inches, the end portions FFL'', HFL''; being out of tight fishing contact, which may be gained by removing the end head and foot fishing surfaces so as to be out of contact with the rail fishing surfaces, as shown, or by removing only one of the head or foot surfaces at the ends of the bar. The central fishing length may be HML for the head and ML for the flange in the long bar as in the short bar, and in both bars this may be reversed, HML being longer than ML, the lengths of HML and ML being within the range of twenty to fourteen inch length. I do not wish to be limited, however, to a bar, one or both of whose fishing surfaces do not provide for rail contact for the full length of its end portions outside of the bar's required moment length. Only a part of each end portion may not provide for rail contact, this being the extreme end portion where there is least wear and therefore greatest resistance of movement of the bar as a whole to the rails. This applies to all lengths of bars greater than the required moment length.

In my Reissue Patent No. 17,561, for rail joint, issued January 14, 1930, as a reissue of my original Patent No. 1,562,423, issued November 17, 1925, I disclose a bar with fishing surfaces decreasing in width from the central portion to the ends so as to improve the tendency of ordinary bars to wear and move faster to the rails at center than at the ends when the bar is in service in a joint. In my two copending applications, Serial Nos. 349,567 and 350,734, for tight center bar and even wear bar, respectively, filed March 28, 1929, I apply the teaching of reduced end fishing surfaces more specifically so as to have the bars move to the rails as fast as or faster than the center.

My Patent No. 1,757,774, for rail joint and bar, issued May 6, 1930, discloses a short bar, shorter than the 24 inch standard short length, this shortened fishing length dispensing with the extreme end resistance to wear and reluctance of the ends to move inward. My patent and applications above identified disclose more or less broadly the general teaching of reduced end fishings, leaving the proper design of a bar as to its fishing surfaces specifically undetermined as to pressure and reaction lengths, there being no specific teaching of the application of end reduction of the fishing surfaces with definite relation to and as affecting vertical integral action of the bars and rail ends of a joint acting as a simple beam under load.

Numerous practical tests have demonstrated the necessity for a remarkably low tolerance permissible in the fit of a bar to the rail ends at the central portion of a rail joint. It is now known that the difference of deflection curvature between the bar and rail ends under load causes the bar to act more or less independently of the rail ends and as a simple beam taking the loads and reactions on restricted fishing areas. It is also known that the required bending moment lengths for bars in general are shorter than the lengths of bars now in use. Railway engineers are devoting most of their attention to central fishing fit, to sections more nearly approaching symmetry with respect to the horizontal gravity axis, and to the supporting ties and ballast.

As far as I am aware, I am the first to disclose reduction of fishing contact at the end portion of the bar as a means to maintain integral action of bars and rail ends in a joint under load. Figures on pressure, reaction and moment lengths in ordinary bars are available and I believe myself to be the first to teach that the overall effective fishing contact length should be made to approximate the moment length, and that at the center where pressure occurs and at the ends of the moment arm where the reactions under pressure occur, the fishing contact lengths should correspond to the pressure and reaction lengths, and furthermore, that these lengths should be of prescribed widths to carry the loads and to insure even lateral movement of the bars to the rails.

The present invention is fundamental and applicable to any design of bar and may be broadly defined as:

A principle of fishing contact construction in a bar with four or more bolt holes for bolting to rail ends of heavy section to form a joint in heavy duty track, the bar being of any type that has top and bottom fishing contact, with fishing surfaces specifically designed to receive and distribute pressure and reactions under positive and negative loading when in a joint. Each fishing surface of the bar length is considered as composed of a central portion, and an intermediate and end portion in each half of the length. The fishings of the central portion which bear the brunt of pressure are of maximum width and of length corresponding to the length which takes the load. The fishing height of the intermediate portion may be the same or less than that of the central portion, but the fishing surfaces are reduced in width or area to accelerate wear in service so that they may move to the rails under bolt tension as fast or faster than the central fishings. The overall length of the central plus the two intermediate portions is the fishing contact required for moment length, and the outer ends of the intermediate portions have sufficient length to receive the reactions from pressure. The end portions of the bar are unimportant and may be treated variously. They may have very slight fishing contact or none, or only one fishing surface may have contact. As far as is practical, the bar has its fishing surfaces specifically designed to perform the functions of a simple beam when in a joint under load and to secure uniform lateral movement to the rails as wear occurs, and the bar is drawn to the rail ends by bolt tension, the result being a tight center and integral action of bars and rail ends when in a joint under load.

As my invention is applicable to any form of head contact, full head contact, head free, flange free or other type of bar having provision for top and bottom fishing contact with rail ends; also to crowned, incurved, outcurved or otherwise shaped bars of angle or I beam type, it is not thought necessary to figure or describe its application to the many types and variations. It may be used in the reforming of worn bars as well as in the manufacture of new ones. The length of a fishing surface will be considered as its length from end to end regardless of any short gaps that might be placed in it for any particular purposes.

What I claim is:

1. In a rail joint including the rail ends, a bar initially having top and bottom fishing contact with the rail ends at the center portion and intermediate portions of the bar for lengths at top and bottom respectively sufficient for bending moments when the joint is subjected to positive and negative train loads, one of the top and bottom members of the bar being of substantially uniform width throughout its length and having a fishing surface in greater width of rail fishing contact at its center portion than at its intermediate portions, with no rail fishing contact at its extreme end portions, and said member having no outward lateral deflection at its end portions.

2. In a rail joint including the rail ends, a bar as in claim 1, the reduction of fishing surface as defined being applied to the top fishing surface, the center portion of which is of a length no more than sufficient to take the pressure under positive train loads.

3. In a rail joint including the rail ends, a bar as in claim 1, the reduction of fishing surface as defined being applied to the bottom fishing surface, the center portion of which is of a length no more than sufficient to take the pressure under negative train loads.

4. In a rail joint including the rail ends, a bar as in claim 1, the reduction of fishing surface as defined being applied to both the top and bottom fishing surfaces of the bar.

5. In a rail joint including the rail ends, a bar as in claim 1, said bar being reformed from an originally rolled bar.

6. In a rail joint including the rail ends, a bar as in claim 1, the one of the top and bottom fishing surfaces out of rail fishing contact at its extreme end portions initially coming into rail fishing contact at its extreme end portions when the joint is under one of positive and negative train loads.

7. In a rail joint including the rail ends, a bar of substantially uniform cross-section initially having top and bottom wear take-up space and top and bottom fishing contact with the rail ends at its center portion and intermediate portions for lengths at top and bottom sufficient respectively for bending moments when the joint is subjected to positive and negative train loads, the top and bottom members of the bar being of substantially equal length, and one of said members being of substantially uniform width throughout its length and having no rail fishing contact or outward lateral deflection at its extreme end portions.

8. In a rail joint including the rail ends, a bar as in claim 7, there being no rail fishing contact at the extreme end portions of both the top and bottom members of the bar.

9. In a rail joint including the rail ends, a bar as in claim 7, there being no rail fishing contact at the extreme end portions of the bottom member of the bar only.

10. In a rail joint including the rail ends, a bar as in claim 7, the respective lengths of top and of bottom rail fishing contact for bending moments being not less than 18 inches.

11. In a rail joint including the rail ends, a bar as in claim 7, said bar being reformed from an originally rolled bar.

12. In a rail joint including the rail ends, a bar as in claim 7, the one of the top and bottom fishing surfaces out of rail fishing contact at its extreme end portions initially coming into rail fishing contact at its extreme end portions when the joint is under one of positive and negative train loads.

13. A rail joint bar providing for top and bottom rail fishing contact at its center portion and intermediate portions, one of the top and bottom members of the bar being of substantially uniform width throughout its length and having a fishing surface providing for greater width of rail fishing contact at its center portion than at its intermediate portions, and for lengths of top and bottom rail fishing contact sufficient respectively for bending moments when in a joint under train loads, there being no outward lateral deflection or provision for rail fishing contact at the extreme end portions of the bar.

14. A rail joint bar as in claim 13, said bar being of uniform fishing height throughout its center portion and intermediate portions.

15. In a rail joint including the rail ends, a bar of substantially uniform cross-section having top and bottom fishing contact with the rail ends at its center portion and intermediate portions for lengths at top and bottom sufficient respectively for bending moments when the joint is subjected to positive and negative train loads, one at least of the top and bottom members of the bar having no outward deflection of nor rail fishing contact at its end portions.

16. In a rail joint including the rail ends, a bar of substantially uniform cross-section having top and bottom fishing contact with the rail ends at its center portion and intermediate portions for lengths at top and bottom sufficient respectively for bending moments when the joint is subjected to positive and negative train loads, said bar being of uniform fishing height throughout its center portion and intermediate portions and of less fishing height at its end portions than at its center portion and intermediate portions, one at least of the top and bottom members of the bar having no outward deflection of nor rail fishing contact at its end portions.

In witness whereof, I hereunto subscribe my name this 5th day of November, 1930.

GEORGE LANGFORD.